(12) United States Patent
Mauss et al.

(10) Patent No.: US 8,754,619 B1
(45) Date of Patent: Jun. 17, 2014

(54) MULTIPHASE POWER CONVERTER

(71) Applicant: Raytheon Company, Waltham, MA (US)

(72) Inventors: Robert A. Mauss, Tucson, AZ (US);
James D. Kueneman, Waltham, MA (US); Jeff L. Vollin, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/688,644

(22) Filed: Nov. 29, 2012

(51) Int. Cl.
*H02M 3/158* (2006.01)
*G05F 1/10* (2006.01)

(52) U.S. Cl.
CPC ........................................ *G05F 1/10* (2013.01)
USPC .......................................... 323/272; 323/283

(58) Field of Classification Search
USPC .......... 323/225, 271, 272, 282, 283, 284, 285
See application file for complete search history.

(56) References Cited

U.S. PATENT DOCUMENTS

| | | | |
|---|---|---|---|
| 7,023,188 B1 | 4/2006 | Rice | |
| 2008/0203985 A1* | 8/2008 | Dong et al. | 323/272 |
| 2010/0033154 A1 | 2/2010 | Cheng et al. | |
| 2010/0327827 A1* | 12/2010 | Moyer et al. | 323/272 |
| 2011/0267019 A1 | 11/2011 | Krishnamurthy et al. | |
| 2012/0049813 A1* | 3/2012 | Huang et al. | 323/272 |
| 2012/0200274 A1 | 8/2012 | Tang et al. | |
| 2012/0262136 A1 | 10/2012 | Nien et al. | |

OTHER PUBLICATIONS

International Search Report and Written Opinion; International Application No. PCT/US2013/061269; International Filing Date: Sep. 24, 2013; Date of Mailing: Apr. 8, 2014; pp. 1-17.

* cited by examiner

*Primary Examiner* — Gary L Laxton
(74) *Attorney, Agent, or Firm* — Cantor Colburn LLP

(57) ABSTRACT

A method for controlling a power converter that includes a first cell having an output connected at a first node in parallel with a second cell includes sensing a voltage signal at the first node, defining a current set point associated with the converter, processing the current set point associated with the converter to define a current set point associated with the first cell, sensing a current output by the first cell, controlling the first cell such that the first cell outputs a current substantially similar to the current set point associated with the first cell, processing the current set point associated with the converter to define a current set point associated with the second cell, sensing a current output by the second cell, and controlling the second cell such that the second cell outputs a current substantially similar to the current set point associated with the second cell.

20 Claims, 4 Drawing Sheets

MULTIPHASE POWER CONVERTER

BACKGROUND

The present invention relates to power converters, and more specifically, to multiphase power converters.

Radio frequency (RF) system performance requirements are placing tighter noise voltage requirements on the converters that supply power to the RF systems. The noise voltage output from a converter ultimately is imposed on the phase noise of the RF system. For power requirements up to, for example, 2 kW, previous systems often used a single converter. The passive components (inductors and capacitors) of the single converter were large in size and have large parasitic elements. The active devices switch slower as they become larger in order to manage the large parasitics that contribute to the noise voltage. The single converter system is less fault tolerant because the single converter offers a single point of failure.

Multiphase power converters offer a number of advantages over the use of a single converter. In this regard, the use of a plurality of converter cells that are modulated allows the use of smaller passive and active components in each cell as compared to the sizes of the active and passive components for a similarly rated single converter system. Though low pass filters may be used to reduce output noise voltage from a multiphase power converter, the additional components used in a low pass filter reduce efficiency and consume valuable space. Though dither techniques may increase effective pulse width modulated (PWM), dither techniques fail to address reduction in control resolution in multiphase applications.

Multiphase power converters (converters) include two or more interleaved converters or cells that are connected to output a summation of the cell outputs. The cells operate at a common frequency (f) and the phases of the outputs of each of the cells are shifted by control logic. In this regard, for n number of cells, the control logic controls the switching time of each cell to induce a difference in phase angle between the outputs of each cell of 360°/n. The cell outputs are connected in parallel. The output of the converter has an output ripple frequency of n×f.

FIG. 1 illustrates a prior art example of a multiphase power converter (converter) 100. The converter 100 includes n number of cells (e.g., 102a, 102b, . . . 102n). Each cell 102 includes a power stage portion 104 that receives a $V_{in}$ signal, a current sense portion 106 that senses the current output by the power stage portion 104, an analog-to-digital converter (ADC) 108 that converts the sensed current signal to a digital output, and a current loop compensator 110 that provides a duty cycle signal to the power stage portion 104. The outputs of each of the cells 102 are connected in parallel and output a signal $V_{out}$. The $V_{out}$ signal is converted by another ADC 112 that outputs a digital signal that is biased by a voltage loop compensator portion 114. The voltage loop compensator portion 114 outputs an $I_{set}$ signal. The current loop compensator portion 110 receives the $I_{set}$ signal and the signal from the ADC 108 to output the duty cycle signal to the power stage portion 104.

SUMMARY

According to one embodiment of the present invention, a multiphase power converter device includes a first cell operative to receive a first voltage signal and output a second voltage signal, and a second cell operative to receive the first voltage signal and output a second voltage signal, wherein the output of the first cell is connected in parallel with the output of the second cell such that an output (Vout) of the multiphase power converter includes the output of the first cell and the output of the second cell, wherein, the first cell includes, a power stage portion operative to receive the first voltage signal and output the second voltage signal, and a control portion operative to sense a current output by the power stage portion, receive a current set point value, process the current set point value to calculate a current set point associated with the first cell, and control the power stage portion such that the power stage portion outputs a current substantially equal to the current set point associated with the first cell, and wherein the second cell includes a power stage portion operative to receive the first voltage signal and output the second voltage signal, and a control portion operative to receive a signal indicative of a current output by the power stage portion, receive the current set point value, process the current set point value as a function of the number of cells in the multiphase power converter to calculate a current set point associated with the second cell, and control the power stage portion such that the power stage portion outputs a current substantially similar to the current set point associated with the second cell.

According to another embodiment of the present invention, a method for controlling a power converter that includes a first cell having an output connected at a first node in parallel with a second cell includes sensing a voltage signal at the first node, defining a current set point associated with the converter, processing the current set point associated with the converter to define a current set point associated with the first cell, sensing a current output by the first cell, controlling the first cell such that the first cell outputs a current substantially similar to the current set point associated with the first cell, processing the current set point associated with the converter to define a current set point associated with the second cell, sensing a current output by the second cell, and controlling the second cell such that the second cell outputs a current substantially similar to the current set point associated with the second cell.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
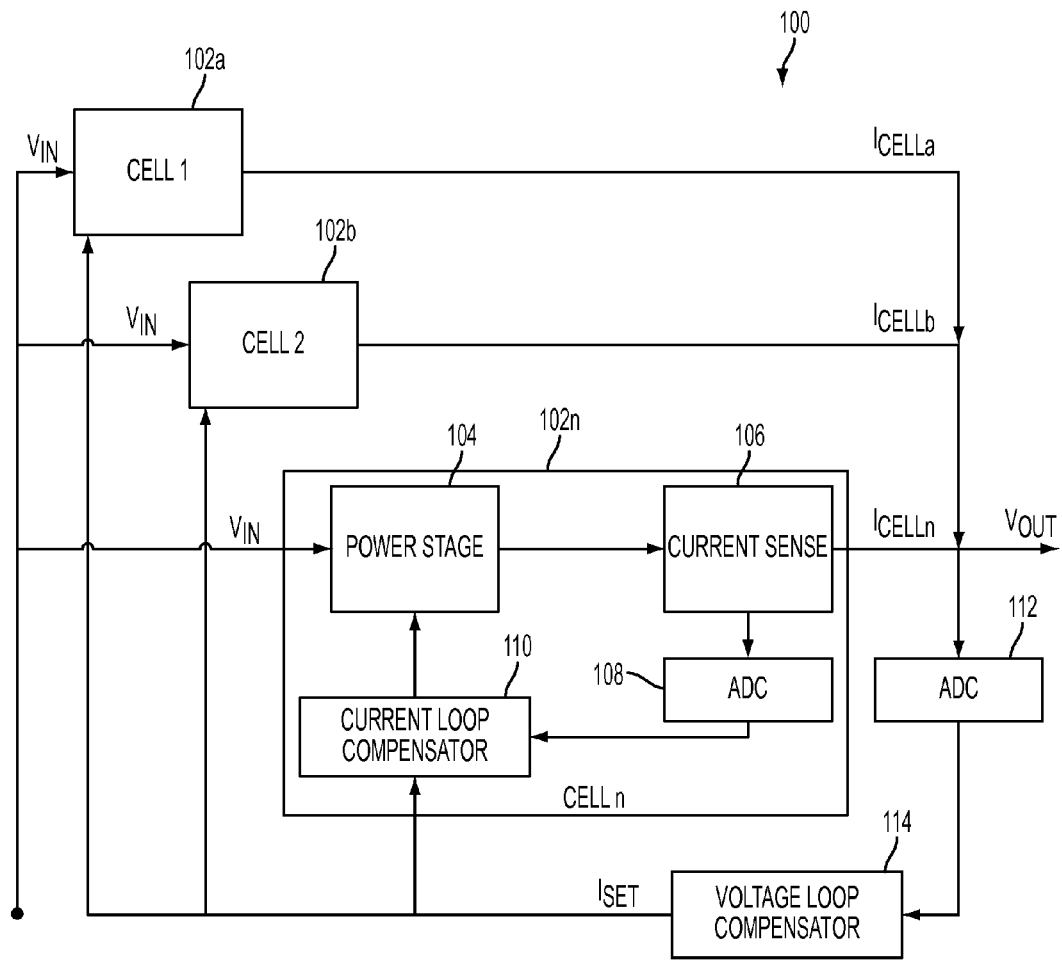
FIG. 1 illustrates a prior art example of a multiphase power converter.

The prior art converter 100 illustrated in FIG. 1 provides advantages over the use of a single converter; however, as the number of cells n increases, the current set point becomes undesirably more coarse. The control portion often jumps between discrete set points to find steady state, which results in higher jitter on the pulse width modulator (PWM) and higher output noise.

Figure 2A:
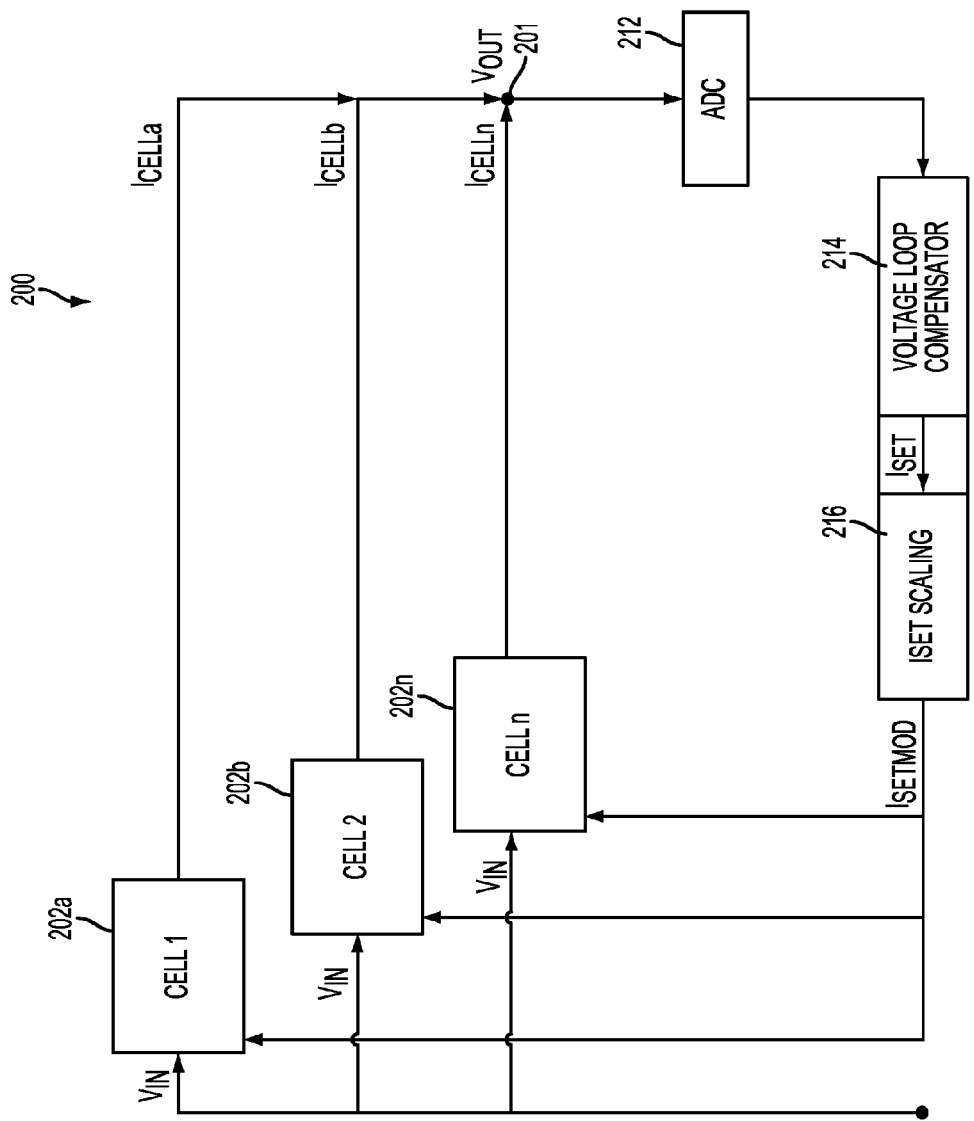
FIGS. 2A and 2B illustrate an exemplary embodiment of a multiphase converter system.
Figure 2B:
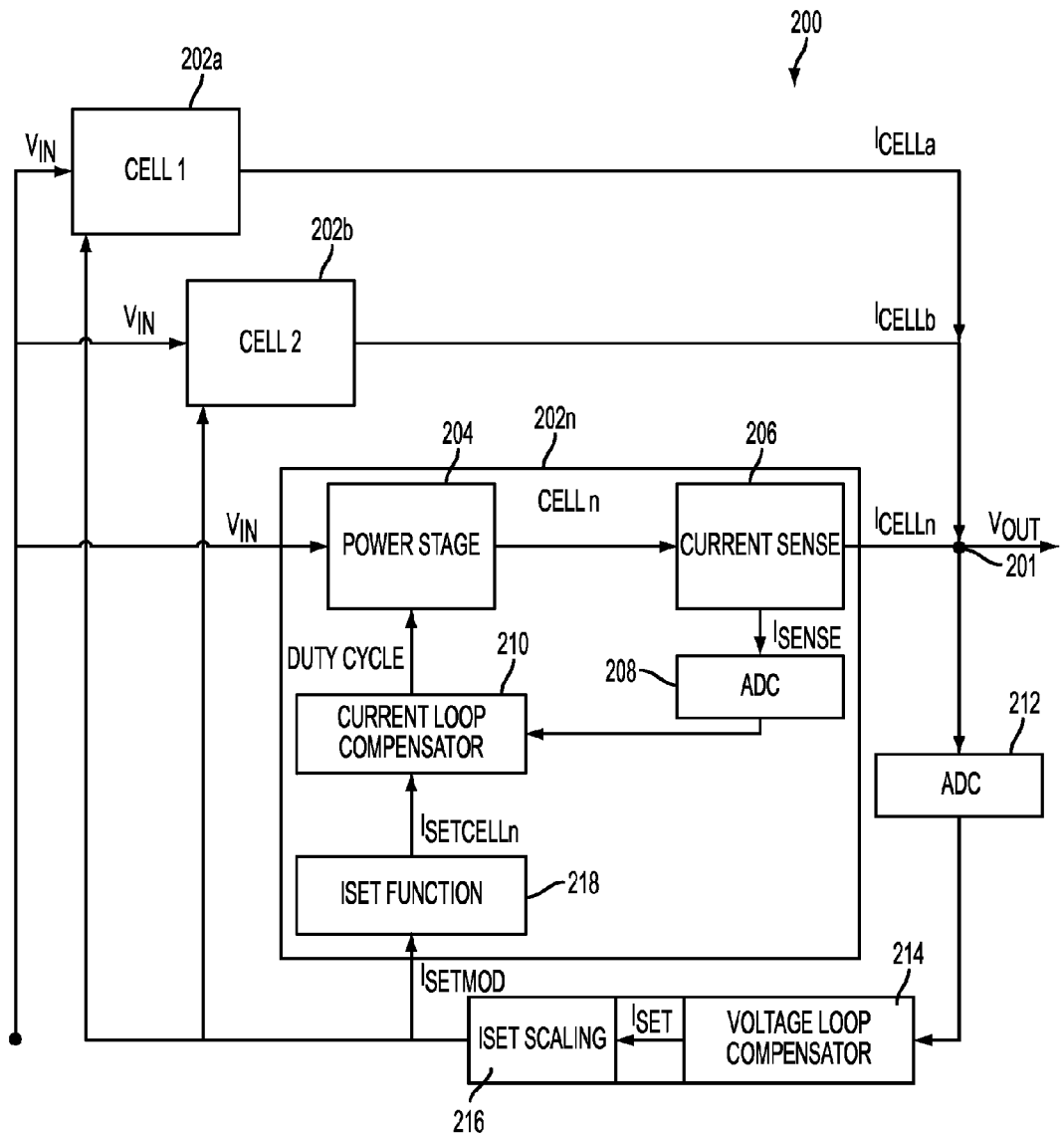

FIGS. 2A and 2B illustrate an exemplary embodiment of a multiphase converter system (converter) 200 that includes a modulator that provides reduced output voltage noise. Referring to FIG. 2A, the converter 200 includes n number of cells 202a-202n. Each cell 202 includes a similar arrangement (as shown in 202n of FIG. 2B) of a power stage portion 204 that receives the $V_{in}$ signal and converts the $V_{in}$ signal to an output voltage and a control portion that includes control logic. The control portion may include for example, an integrated processor, a programmable integrated controller, a field programmable gate array, or a logic circuit. The control portion in each cell 202 includes a current sense portion 206, an ADC 208, a current loop compensator portion 210 and an $I_{set}$ function portion 218. The converter 200 includes an ADC 212, a voltage loop compensator portion 214, and an $I_{set}$ scaling portion 216 that are operative to control the converter 200. The current sense portion 206 senses the current output by the power stage portion 204 and outputs a signal ($I_{sense}$) indicative of the sensed current to the ADC 208 that outputs a digital signal indicative of the sensed current output by the power stage portion 204. Each of the outputs of the cells 202 is connected in parallel to output a $V_{out}$ signal from the converter 200. The $V_{out}$ signal at a node 201 is converted by the ADC 212 into a digital signal that is received by the voltage loop compensator portion 214.

Figure 3:
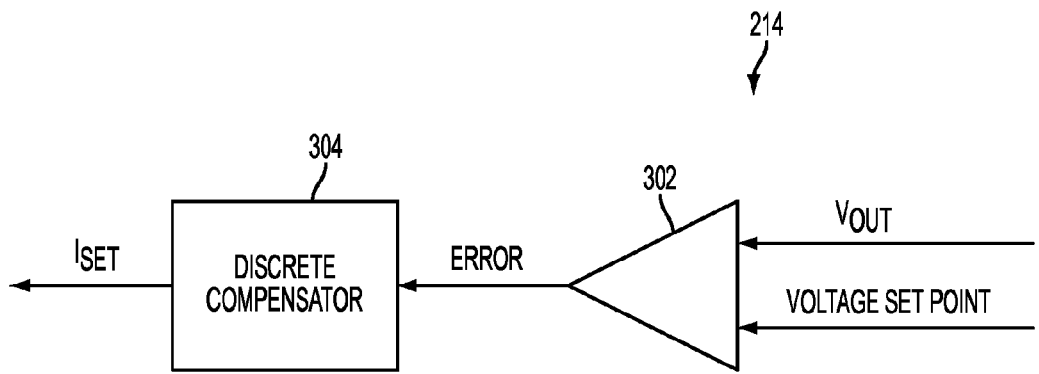
FIG. 3 illustrates an exemplary embodiment of the voltage loop compensator portion.

FIG. 3 illustrates an exemplary embodiment of the voltage loop compensator portion 214. The voltage loop compensator portion 214 is operative to compare the $V_{out}$ signal with a voltage setpoint with a comparator 302 that outputs an error signal, which signal is fed to a discrete compensator 304 that produces a digital value representing a current set point ($I_{set}$) that is output by the voltage loop compensator portion 214. The $I_{set}$ scaling portion 216 scales the resolution of the $I_{set}$ signal by the number of cells n and outputs a modified or scaled signal ($I_{set\_mod}$). In this regard, the output range, or resolution of the voltage compensator is multiplied by n. This increases the output resolution of the voltage compensator. The $I_{set}$ function portion 218 receives the $I_{set\_mod}$ signal, processes the $I_{set\_mod}$ signal, and outputs an $I_{setcelln}$ signal. The $I_{set}$ function portion 218 defines the $I_{setcelln}$ signal as a function of the $I_{set\_mod}$ signal. For example $I_{setcelln}=[I_{set\_mod}+(n\text{-cell number})]/n$, where cell number is the particular number of a cell (e.g., cell 202a has a cell number=1, cell 202b has a cell number=2, . . . cell 202n has a cell number=n). The cell number associated with each cell 202 may be assigned arbitrarily. The cell number assignment for each cell 202 may also be modulated over time, rearranged on a multiple of switching cycles, or an alternative time interval. The functions described above are mere examples, alternative embodiments may include other functions or alternative means for control such as, for example, look up tables stored in memory and used by a control processor and/or additional discrete communications paths.

Figure 4:
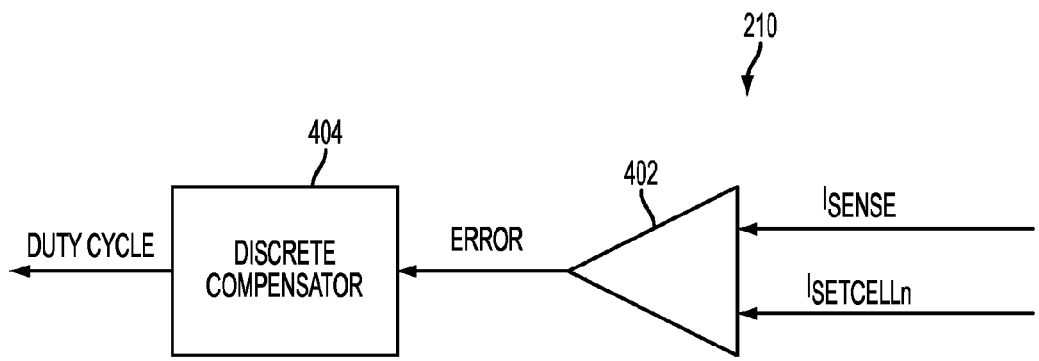
FIG. 4 illustrates an exemplary embodiment of the current loop compensator portion.

FIG. 4 illustrates an exemplary embodiment of the current loop compensator portion 210. The current loop compensator portion 210 receives the $I_{setcelln}$ signal from the $I_{set}$ function portion 218 and the digitally converted $I_{sense}$ signal from the ADC 208. The current loop compensator portion 201 is operative to compare the $I_{setcelln}$ signal with the $I_{sense}$ signal to produce an error signal. The generated error signal is fed into a discrete compensator which produces a digital value output by the current loop compensator portion 210 representing a desired on-time, or duty cycle signal, by the PWM (pulse width modulator) located in power stage portion 204. The digital PWM converts this value to a duty cycle for the switching converter. A conversion ratio that is dependent on the power stage topology of the cell, relates the commanded duty cycle to a particular output signal from the power stage.

The methods and embodiments described above offer a modulation scheme for a multiphase power converter system. Each of the cells in the power converter system receive a scaled current set command that is modulated such that each cell has a particular current set point to control the PWM of the cell.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A multiphase power converter device comprising:
   a first cell operative to receive a first voltage signal and output a second voltage signal; and
   a second cell operative to receive the first voltage signal and output a second voltage signal, wherein the output of the first cell is connected in parallel with the output of the second cell such that an output ($V_{out}$) of the multiphase power converter includes the output of the first cell and the output of the second cell;
   wherein, the first cell includes:
      a power stage portion operative to receive the first voltage signal and output the second voltage signal; and
      a control portion operative to sense a current output by the power stage portion, receive a current set point value, process the current set point value to calculate a current set point associated with the first cell, and control the power stage portion such that the power stage portion outputs a current substantially equal to the current set point associated with the first cell; and wherein the second cell includes:

a power stage portion operative to receive the first voltage signal and output the second voltage signal; and a control portion operative to receive a signal indicative of a current output by the power stage portion, receive the current set point value, process the current set point value as a function of the number of cells in the multiphase power converter to calculate a current set point associated with the second cell, and control the power stage portion such that the power stage portion outputs a current substantially similar to the current set point associated with the second cell.

2. The device of claim 1, wherein the current set point associated with the first cell is uniquely associated with the first cell.

3. The device of claim 1, wherein the current set point associated with the first cell is different from the current set point associated with the second cell.

4. The device of claim 1, wherein the control portion of the first cell comprises:

a current sense portion operative to sense the current output by the power stage portion and output a signal indicative of the sensed current output by the power stage portion;

an analog-to-digital converter (ADC) portion operative to convert the signal indicative of the sensed current output by the power stage portion to a digital signal and output the digital signal;

an $I_{set}$ function portion operative to receive a signal indicative of a current set point associated with the multiphase power converter, and process the current set point associated with the multiphase power converter to calculate the current set point associated with the first cell; and a current loop compensator portion operative to receive the digital signal indicative of the sensed current and the current set point associated with the first cell and output a control signal to the power stage portion that is operative to control the power stage portion to output a current signal having a current that is substantially similar to the current set point associated with the first cell.

5. The device of claim 4, wherein the $I_{set}$ function portion calculates the current set point associated with the first cell as a function of a number of cells in the multiphase power converter.

6. The device of claim 4, wherein the $I_{set}$ function portion calculates the current set point associated with the first cell as a function of a cell number associated with the first cell, where the cell number associated with the first cell is 1, and the current set point associated with the first cell=[the current set point associated with the multiphase power converter+(a number of cells in the multiphase power converter−the cell number associated with the first cell)]/the number of cells in the multiphase power converter.

7. The device of claim 1, wherein the control portion of the second cell comprises:

a current sense portion operative to sense the current output by the power stage portion and output a signal indicative of the sensed current output by the power stage portion;

an analog-to-digital converter (ADC) portion operative to convert the signal indicative of the sensed current output by the power stage portion to a digital signal and output the digital signal;

an $I_{set}$ function portion operative to receive an signal indicative of a current set point associated with the multiphase power converter, and process the current set point associated with the multiphase power converter to calculate the current set point associated with the second cell; and a current loop compensator portion operative to receive the digital signal and the current set point associated with the second cell and output a control signal to the power stage portion that is operative to control the power stage portion to output a current signal having a current that is substantially similar to the current set point associated with the second cell.

8. The device of claim 7, wherein the $I_{set}$ function portion calculates the current set point associated with the second cell as a function of a number of cells in the multiphase power converter.

9. The device of claim 7, wherein the $I_{set}$ function portion calculates the current set point associated with the second cell as a function of a cell number associated with the second cell, where the cell number associated with the second cell is 2, and the current set point associated with the second cell=[the current set point associated with the multiphase power converter+(a number of cells in the multiphase power converter−the cell number associated with the second cell)]/the number of cells in the multiphase power converter.

10. The device of claim 1, wherein the multiphase power converter includes a control portion operative to calculate a current set point associated with the multiphase power converter and output the current set point associated with the multiphase power converter to the first cell and the second cell.

11. The device of claim 1, wherein the multiphase power converter includes a control portion that comprises:

an ADC that is operative to convert the $V_{out}$ signal into a digital signal and output the digital signal;

a voltage loop compensator portion operative to receive the digital signal and compare the digital signal to a voltage set point to output a current set point associated with the multiphase power converter.

12. The device of claim 11, wherein the control portion further comprises an Iset scaling portion operative to scale the output range of the voltage compensator that provides a current set point associated with the multiphase power converter as a function of a number of cells in the multiphase power converter.

13. A method for controlling a multiphase power converter (converter) that includes a first cell having an output connected at a first node in parallel with a second cell, the method comprising:

sensing a voltage signal at the first node;

defining a current set point associated with the converter;

processing the current set point associated with the converter to define a current set point associated with the first cell;

sensing a current output by the first cell;

controlling the first cell such that the first cell outputs a current substantially similar to the current set point associated with the first cell;

processing the current set point associated with the converter to define a current set point associated with the second cell;

sensing a current output by the second cell; and controlling the second cell such that the second cell outputs a current substantially similar to the current set point associated with the second cell.

14. The method of claim 13, wherein the current set point associated with the first cell is uniquely associated with the first cell, and the current set point associated with the second cell is uniquely associated with the second cell.

15. The method of claim 13, wherein the current set point associated with the first cell is different from the current set point associated with the second cell.

16. The method of claim 13, wherein the defining the current set point associated with the converter includes:
    comparing the sensed voltage signal at the first node with a voltage set point; and
    calculating the current set point associated with the converter as a function of a difference between the sensed voltage signal and the voltage set point.

17. The method of claim 13, wherein the defining the current set point associated with the converter includes:
    comparing the sensed voltage signal at the first node with a voltage set point;
    calculating the current set point associated with the converter as a function of a difference between the sensed voltage signal and the voltage set point; and
    scaling the current set point range of the voltage loop compensator associated with the converter as a function of a number of cells in the converter.

18. The method of claim 13, wherein processing of the current set point associated with the converter to define a current set point associated with the first cell includes calculating the current set point associated with the first cell as a function of a cell number associated with the first cell, where the cell number associated with the first cell is 1, and the current set point associated with the first cell=[the current set point associated with the converter+(a number of cells in the converter−the cell number associated with the first cell)]/the number of cells in the converter.

19. The method of claim 13, wherein processing of the current set point associated with the converter to define a current set point associated with the second cell includes calculating the current set point associated with the second cell as a function of a cell number associated with the second cell, where the cell number associated with the second cell is 2, and the current set point associated with the second cell=[the current set point associated with the converter+(a number of cells in the converter−the cell number associated with the second cell)]/the number of cells in the converter.

20. The method of claim 13, further comprising of converting the sensed voltage signal into a digital signal and converting the sensed current signal into a digital signal.

\* \* \* \* \*